July 17, 1928.  
E. D. LOWRIE  
1,677,722  
METHOD OF FORMING TAPERED CROSS SECTION DISKS  
Filed July 9, 1923  
2 Sheets-Sheet 1

Inventor  
Edward D. Lowrie

July 17, 1928.
E. D. LOWRIE
1,677,722
METHOD OF FORMING TAPERED CROSS SECTION DISKS
Filed July 9, 1923   2 Sheets-Sheet 2
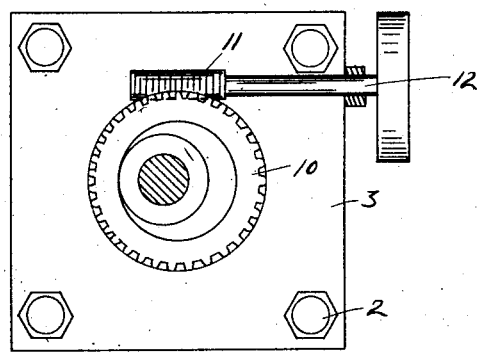
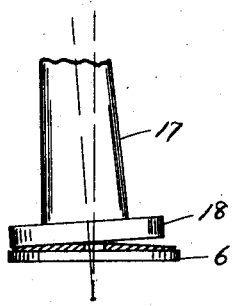
Inventor
Edward D. Lowrie
Attorneys Patented July 17, 1928.

1,677,722

UNITED STATES PATENT OFFICE.

EDWARD D. LOWRIE, OF DETROIT, MICHIGAN, ASSIGNOR, BY MESNE ASSIGNMENTS, TO STEEL WHEEL CORPORATION, OF LANSING, MICHIGAN, A CORPORATION OF MICHIGAN.

METHOD OF FORMING TAPERED CROSS-SECTION DISKS.

Application filed July 9, 1923. Serial No. 650,564.

The invention relates to a method for forming tapered disks such as are used for example in the manufacture of vehicle wheels.

In the present state of the art, is it usual to form the taper by a machining process and while it has been suggested to roll the metal between conical rollers, this involves a more or less complicated apparatus which my invention is designed to overcome. My method consists essentially of placing the material, such as a disk of uniform thickness, between two flat plates which are arranged at an angle to each other and may be relatively oscillated to produce a wobbling action. Means is also provided for maintaining a high pressure between the two plates so that the combined rotation and pressure will produce the desired taper in the disk.

In the drawings:—

Figure 1 is a sectional elevation of a machine;

Figure 3 illustrates a modification in which the spindle is offset with respect to the stationary plate;

Figure 2:
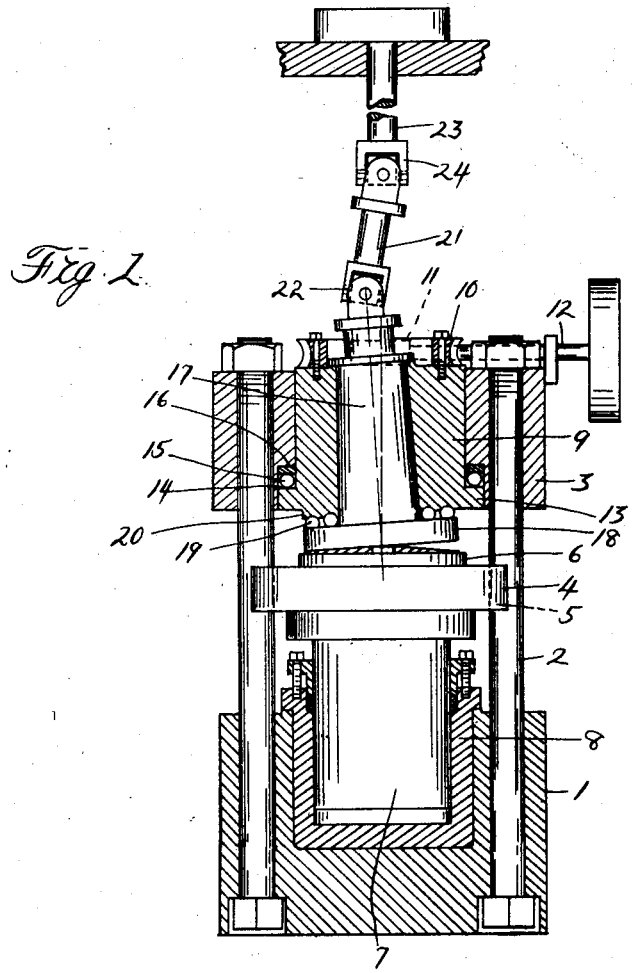
Figure 2 is a plan view thereof.

1 represents a suitable base for a machine having the vertically extending posts 2 carrying a cross member 3 spaced from the base 1. 4 is a vertically movable table having guideways 5 engaging the posts 2 and carrying on its upper surface a hardened steel plate 6 adapted to receive the disk to be formed. The table 4 is supported on a plunger 7 of a hydraulic ram 8 which may be operated by suitable means, not shown in the drawing.

9 is a rotatable member which is journaled in the cross member 3 and provided with a worm gear 10 meshing with worm 11 on shaft 12 also journaled upon the member 3. The rotatable member 9 is formed with an annular flange 13 engaging an annular recess 14 in the member 3 and a thrust bearing 15 is interposed between the flange and the shoulder 16 in the cross member 3. Journaled within the rotable member 9 is a spindle 17 arranged at an angle to the axis of the rotatable member 9 corresponding with the taper of the disk to be formed and carrying at its lower end the hardened steel plate 18 perpendicular to the axis of the spindle. A thrust bearing 19 is interposed between the plate 18 and the bottom surface 20 of the member 3. For rotating the spindle 17, a suitable driving connection may be employed such as a knuckle shaft 21 connected to the spindle through a universal joint 22 and connected also with a driving shaft 23 by a universal joint 24.

The driving shaft 23 may be driven in timed relation with the driving shaft 12 or it may be connected to the body of the press to hold the spindle 17 stationary with respect thereto or again it may be left free to revolve.

In the operation of the machine as thus far described, the work is placed between the hardened steel plates 6 and 18 preferably after having been heated to a sufficient temperature to render it in the best condition for rolling and the rotatable member 9 is driven by means of a suitable drive on the shaft 12. At the same time, the hydraulic press 8 is operated to obtain a sufficient pressure between the plates and it will be evident that because of the angular relation to the spindle 17 the plate 18 will be given a wobbling motion with respect to the plate 6. As stated before, the spindle may be free to revolve about its own axis or it may be driven in timed relation with the member 9 but in either case the work will be rolled between the plates under pressure which will form it into a tapered disk having the same angle as that between the axes of the spindle and rotatable member 9.

It will be noted in Figure 1 that the axis of the rotatable spindle 17 intersects the axis of the rotatable member 9 in the plane of the disk to be formed. In the modification, as shown in Figure 3. the axes are arranged to intersect outside of the plane of the disk and in this construction, the plate 18 has more of an orbital movement around the axis of the rotatable member 9.

Figure 4:
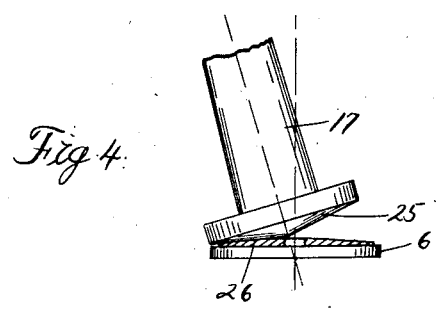
Figure 4 is a modification permitting a variation in the taper of the disks formed upon the machine.

In Figure 4, I have shown another modification which permits the same machine to be used for forming disks of different tapers. The axis of the spindle 17 is arranged at an angle with the axis of the rotatable member 9 corresponding to the maximum angle that the disks may be tapered. Instead of using the flat plate 18 for contacting with the disk I employ a conical shaped member 25 suitably secured to the member 18 and having its conical surface 26 symmetrically arranged with respect to the axis of the spindle 17. It will be observed that the taper of the disk will depend upon the angle between the conical surface 26 and the lower plate 6. Thus, it is possible to use the machine for forming disks of any taper up to the maximum as determined by the angular arrangement of the axes simply by using interchangeable conical members 25 having different cone angles.

What I claim as my invention is:—

1. The method of forming tapered disks which consists in placing the material between plates having faces arranged at an angle to each other, positively rotating one of said plates about an axis perpendicular thereto and simultaneously imparting a relative wobbling motion between said plates.

2. The method of forming tapered disks which consists in placing the material between plates having faces arranged at an angle to each other, positively rotating one of said plates about an axis perpendicular to its face and simultaneously imparting a wobbling motion to said plate relative to the other of said plates.

3. The method of forming tapered disks which consists in placing the material between plates having faces arranged at an angle to each other, rotating one of said plates about an axis perpendicular to its face and simultaneously imparting a relative wobbling motion between said plates in timed relation with said rotation.

4. The method of forming tapered disks which consists in placing the material between plates having faces arranged at an angle to each other, positively rotating one of said plates about an axis perpendicular to its face, simultaneously imparting a wobbling motion to said plate in timed relation with said rotation and pressing one of said plates towards the other during the rotation and wobbling movement.

5. A method of forming a tapered disk which includes the steps of applying pressure to a blank by means of a plate, positively rotating the plate, and revolving the plate about an axis distinct from that axis on which the said plate is rotated.

6. A method of forming a tapered disk which includes the steps of applying pressure to a blank by means of a plate, positively rotating the plate, and revolving the plate about an axis angularly arranged with respect to the axis on which the plate is rotated.

In testimony whereof I affix my signature.

EDWARD D. LOWRIE.